US006637764B2

(12) United States Patent
Novakowski

(10) Patent No.: US 6,637,764 B2
(45) Date of Patent: Oct. 28, 2003

(54) WASTE TRANSPORTATION UNIT

(76) Inventor: Jason C. Novakowski, Bay #2, 2280 Pegasus Ways, N.E., Calgary, Alberta (CA), T2E 8M5

( * ) Notice: Subject to any disclaimer, the term of this patent is extended or adjusted under 35 U.S.C. 154(b) by 2 days.

(21) Appl. No.: 09/863,630

(22) Filed: May 23, 2001

(65) Prior Publication Data

US 2002/0175496 A1 Nov. 28, 2002

(51) Int. Cl.[7] .............................. B60D 1/00; B65F 3/00

(52) U.S. Cl. ................................ 280/504; 280/DIG. 8; D12/15; 224/404; 224/495; 224/511; 224/519; 296/24.1; 296/181; 296/146.9; 296/155

(58) Field of Search ........................... D12/15; 280/504, 280/DIG. 8, 937–839; 224/401, 404, 495, 511, 512, 519; 296/24.1, 181, 146.1, 147, 146.9, 149, 155; 16/95 R, DIG. 1, 94 R, 96 R, 87 B

(56) References Cited

U.S. PATENT DOCUMENTS

| | | | | | |
|---|---|---|---|---|---|
| 3,600,866 | A | * | 8/1971 | Griffith | 52/64 |
| 5,383,703 | A | * | 1/1995 | Irvine, III | 296/181 |
| 5,445,373 | A | * | 8/1995 | Franks | 473/409 |

* cited by examiner

*Primary Examiner*—Lesley D. Morris
*Assistant Examiner*—Matthew Luby
(74) *Attorney, Agent, or Firm*—Anthony J. Casella; Gerald E. Hespos

(57) ABSTRACT

A transportation unit is provided for the secure and efficient collection, storage, and hauling of waste. The unit consists of a fully enclosed containment area that is secured to a frame and supported by wheels. The containment area is equipped with a dual access sliding door system to facilitate the convenient loading and unloading of waste.

11 Claims, 4 Drawing Sheets

WASTE TRANSPORTATION UNIT

FIELD OF THE INVENTION

This invention relates to a waste transportation unit, more particularly a unit with an easily accessible, fully enclosed containment space, for use in areas such as airports, where safety and efficiency are of primary concern.

BACKGROUND OF THE INVENTION

The traditional means of waste transportation at airports, and other areas with similar needs, generally consists of a wagon or cart-like structure, with four walls mounted on a platform and a set of supporting wheels. The garbage is usually manually thrown over the side of one of the walls, and into the containment area, to be transported by a towing vehicle to another location for disposal.

While this arrangement is somewhat satisfactory, it does not provide a fully enclosed area to securely contain waste. As a result, garbage will often fall, or be blown by wind, over the edges of the cart or wagon and onto the ground. This can occur while the unit is stationary, or while it is being transferred to a disposal site. The garbage may also be exposed to rain, resulting in a mess and causing the garbage to become heavier, thereby making it more difficult for personnel to unload. In areas like airports, loose garbage can raise safety issues, cause damage to costly mechanical equipment and inconvenience loading personnel. Therefore, a need remains for a more secure and efficient method of waste transportation in such areas.

SUMMARY OF THE INVENTION

It is therefore an objective of the present invention to provide a safe waste transportation unit that is secure and capable of keeping garbage completely contained while it is being transported or stored. It is a further objective of the invention to provide a waste transportation unit that allows for waste to be quickly and efficiently loaded and unloaded by personnel.

Regarding the first objective, a transportation unit that is equipped with a fully enclosed waste containment area is provided. The waste containment area is a box-like structure, consisting of a floor, two end walls, two side walls and a top cover. Each side wall includes a large hinged door, which contains a smaller sliding door within. During the storage and transportation of garbage, the doors remain closed and secured, so that the garbage cannot fall out of the containment area, or be blown out by the wind. This ensures that the outside area is kept free of loose garbage which may cause safety issues to arise, or damage costly mechanical equipment. Furthermore, the fully enclosed containment area reduces the inconvenience experienced by the loading personnel, who would otherwise frequently be forced to stop and retrieve stray garbage.

The fully enclosed waste containment area of the unit is secured to a frame supported by wheels, to allow for the waste to be transported after it has been loaded into the unit. The unit is towed using a tow bar and is equipped with fifth wheel steering. As a safety precaution, a braking mechanism, which locks the front wheels is provided for when the unit is not secured to a towing source. Each unit is also equipped with reflectors on each corner and on all sides. To maximize efficiency, a rear hitching system is in place to enable several units to be linked together so that they can be towed at one time and by one source.

The second objective of providing a transportation unit that is capable of securely containing garbage, without detracting from the efficiency of the loading and unloading process, is achieved by the addition of a dual access door system to each side of the waste containment area. The two door system is composed of one large door and one smaller door.

The large door attaches by hinges to the side wall of the unit, allowing it to be swung open for the unloading of the garbage and swung shut during storage or transportation. A handle is provided to facilitate the opening and closing and a hydraulic shock is attached to the upper corner of the door to hold it open while waste is being unloaded.

The large door also contains a hollow portion that forms a pocket into which the small door slides. The sliding door is particularly useful during the loading of garbage into the unit, as the narrower space prevents any loose garbage from falling out of the containment area. The sliding of the small door into the larger door is accomplished by virtue of a ledge that runs continuously along the inside of the large door, from one end to the other. The small door is equipped with wheels to assist in sliding along the ledge and into the hollow pocket of the larger door.

In a broad aspect, then, the present invention relates to a device for transporting objects, including a wheeled undercarriage and an enclosed containment area.

BRIEF DESCRIPTION OF THE DRAWINGS

The preferred embodiment of the present invention will now be described in greater detail, and will better understood when read in conjunction with the following drawings, in which.

DETAILED DESCRIPTION OF THE DRAWINGS

Figure 1:
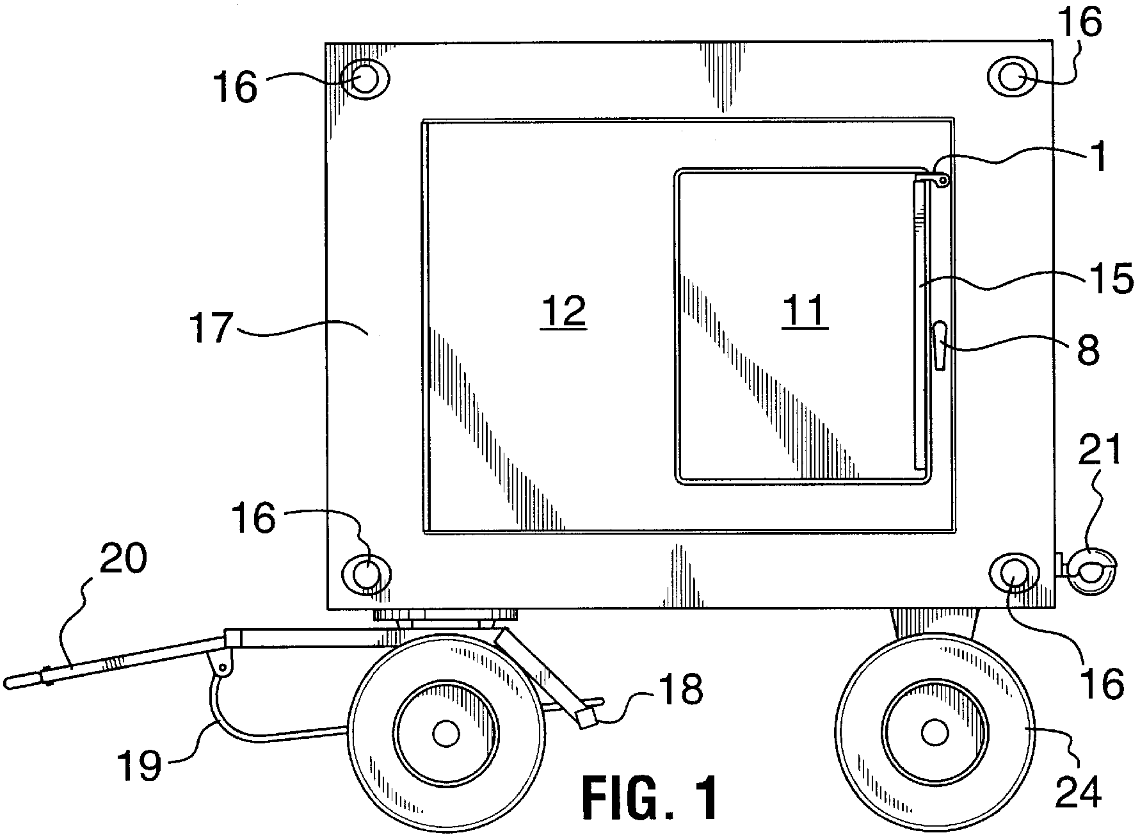
FIG. 1 shows a side view of the waste transportation unit with both the large hinged door, and the smaller sliding door secured in a closed position.

FIG. 1 shows the waste transportation unit in a stationary position, ready to be attached to a towing vehicle. The unit primarily consists of a waste containment area 23, that is supported on a frame with wheels 24.

The wheeled frame 24 includes a tow bar 20, that is connected by a rod 19 to a brake 18. When the unit is attached or ready to be attached to a towing vehicle, the tow bar 20 is placed in a lowered position. This moves the rod 19, and releases the brake 18, allowing the wheels to rotate freely, so that the unit can be transported by a towing vehicle to a disposal site.

The waste containment area 23 is composed of four walls, a top cover and a floor platform. Each of the side walls 17 contains one large door 12, which attaches by hinges to the side wall 17, to allow the door to open and close. Each of the two large doors 12 contain a smaller sliding door 11. Both the large hinged door 12 and the smaller sliding door 11 are equipped with latching mechanisms 1 & 8 to secure the doors in a closed position when the unit is not being loaded. As a safety precaution, all corners of the waste containment unit are equipped with reflectors 16.

Figure 2:
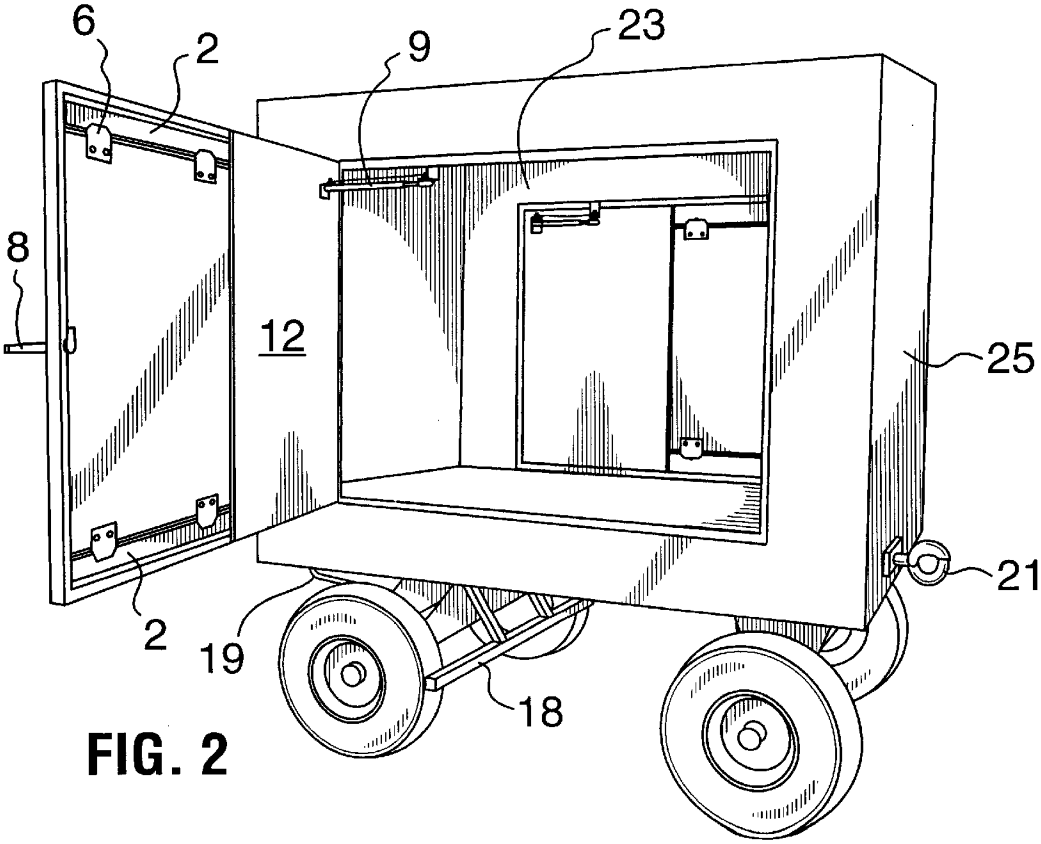
FIG. 2 shows a side view of the large hinged door in an open position.

In FIG. 2 the waste transportation unit is shown in a stationary position with the large hinged door 12 open in preparation for unloading. During the unloading process, the tow bar 20 assumes an upright position, causing the rod 19 to shift and force the braking mechanism 18 against the wheels 24 to prevent the unit from moving forward or backward. Also shown is the hitch 21, which is located at the end wall 25 of the unit. The hitch 21 allows several transportation units to be linked together so that only one towing source is required for all units.

Figure 3:
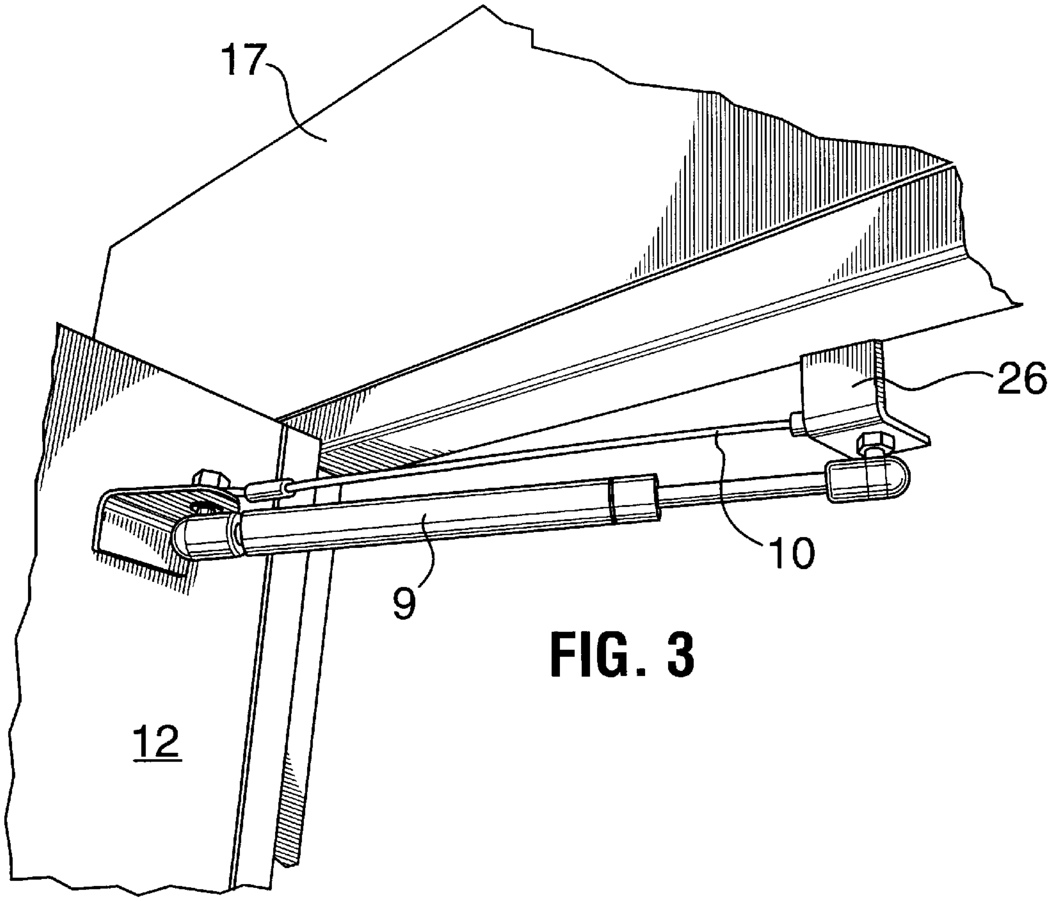
FIG. 3 shows in greater detail, a side view of the hydraulic shock mechanism used to keep the large hinged door in an open position during the unloading of waste.

FIG. 3 provides an enlarged view of the hydraulic shock 9 used to keep the large door 12 open during the unloading process. A cable 10 acts in conjunction with the hydraulic shock to prevent the large door 12 from opening too far. Both the cable 10 and the shock 9 are affixed to a small protruding attachment 26 on the underside of the side wall 17.

Figure 4A:
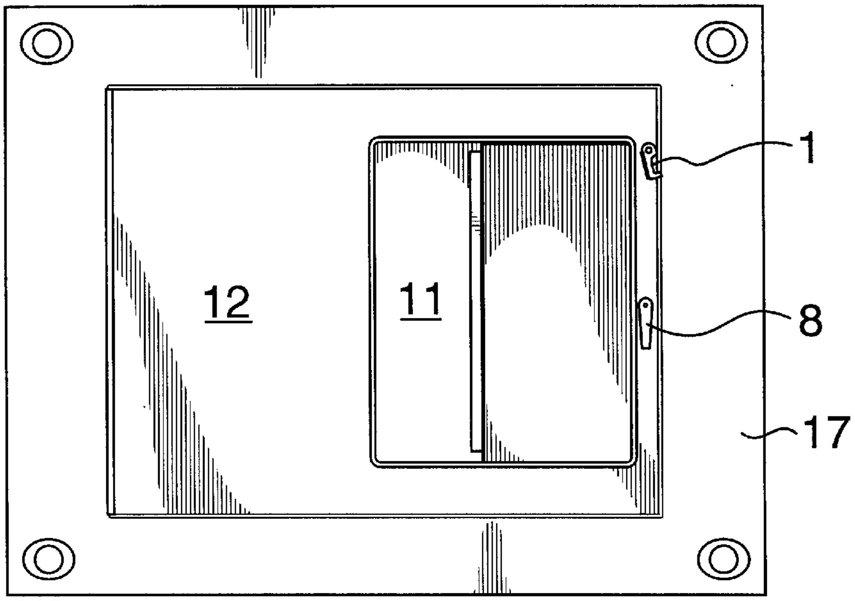
FIG. 4*a* shows a sectional view of the small sliding door contained within the pocket of the larger hinged door.
Figure 4B:
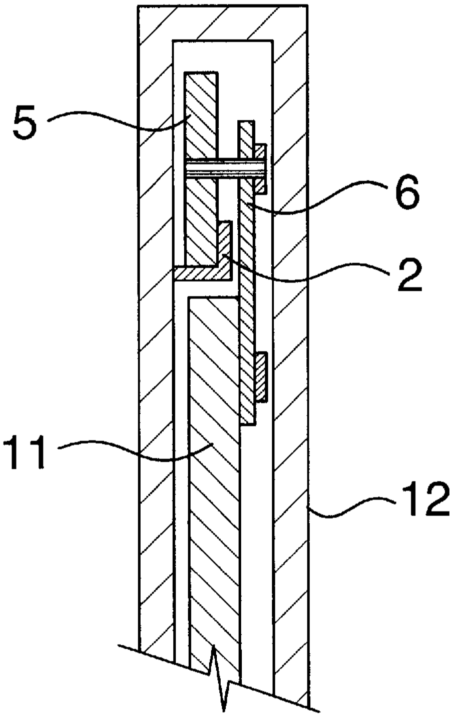
FIG. 4 shows a side view of the waste transportation unit with the larger, hinged door in a closed position, and the smaller sliding door in a partially opened position.
Figure 5:
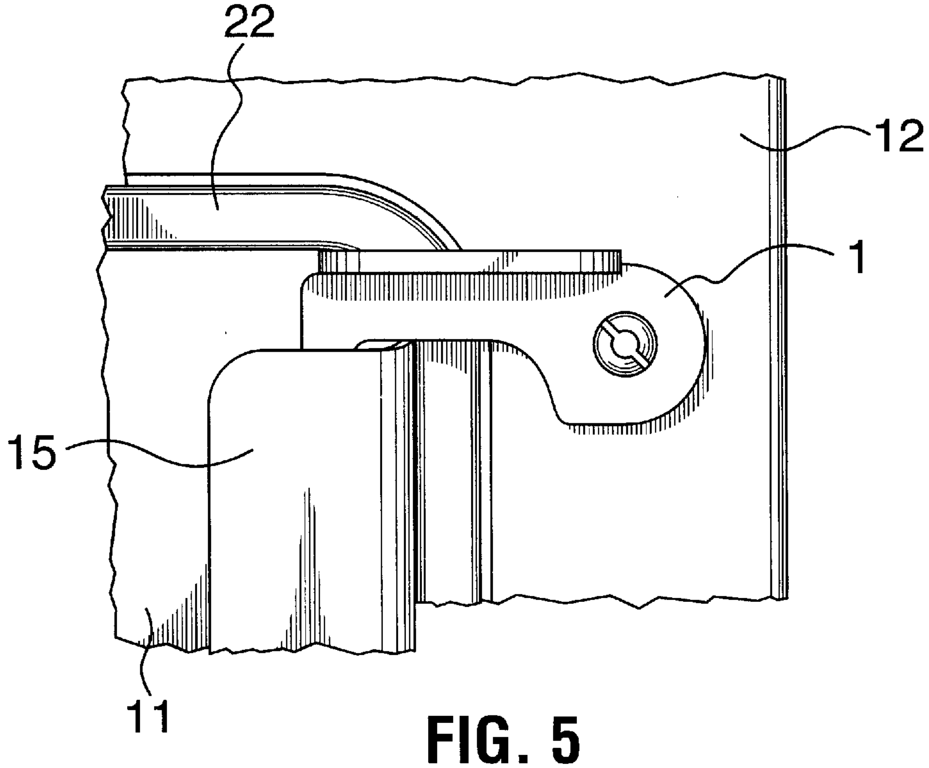
FIG. 5 shows a side view of the latching mechanism of the larger hinged door, holding the smaller sliding door in a closed position.

In FIG. 4 the smaller sliding door 11 is shown in a partially open position, with one half of the door concealed within the pocket of the larger door 12. FIG. 4*a* provides a sectional view of the smaller door 11 sliding into the hollow pocket contained within the larger door 12. The small door 11 is shown sliding on a wheel 5, along the protruding ledge 2 that runs continuously along the upper and lower interior edges of the large door 12. The latching mechanism 1 for the small door 11 can be seen in FIG. 5, which shows the sliding door 11 in a closed position within the larger door 12. The latching mechanism I is attached to the large door 12 and catches on a protruding ledge 15 on the small sliding door 11 to secure the door in place when loading has been completed. Also shown in FIG. 5 is a door liner 22, which serves to protect the loading personnel from the sharp edges of the door.

Figure 6:
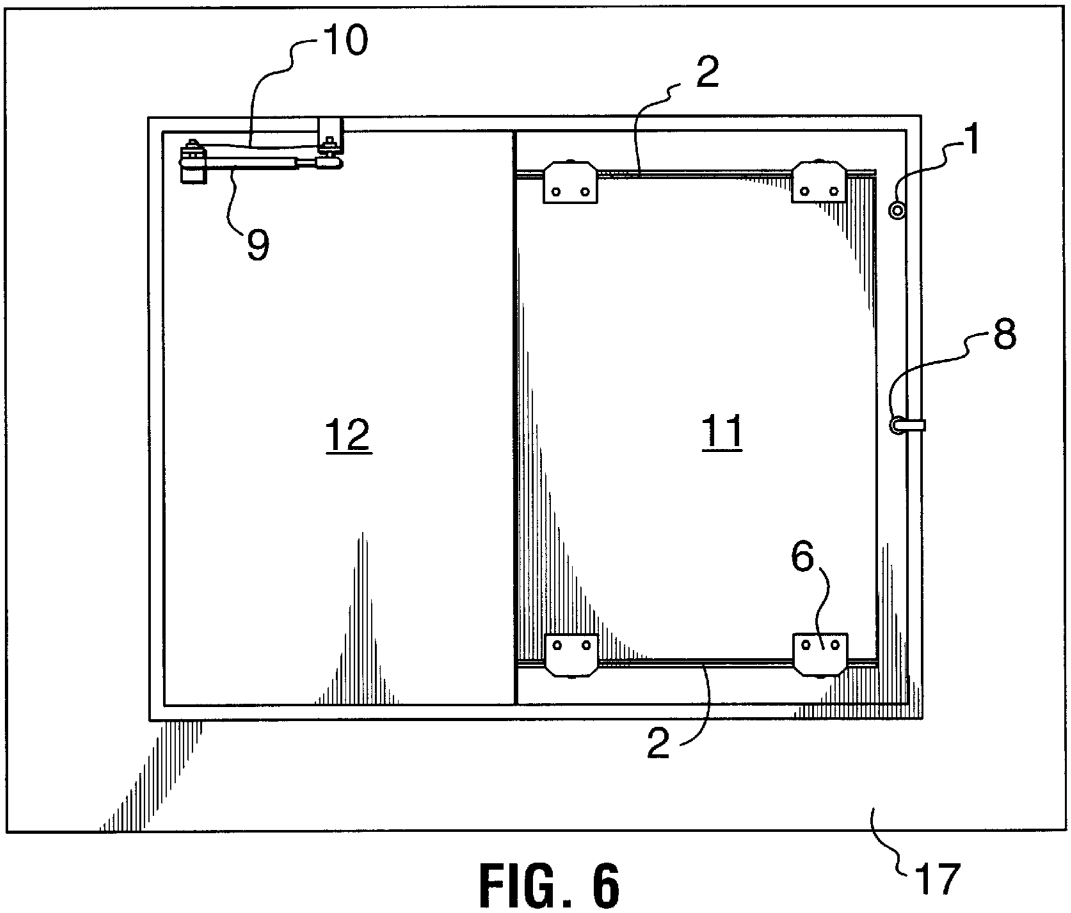
FIG. 6 shows a side view, of the inside of the two-door system.
Figure 7:
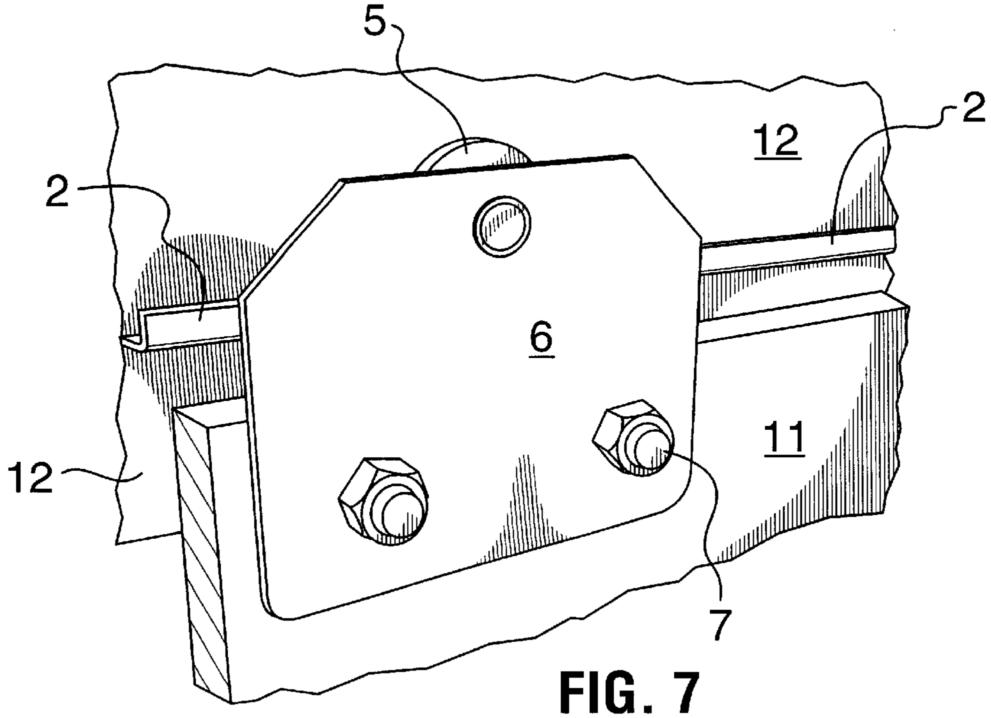
FIG. 7 shows a side view of the sliding mechanism of the smaller door.

FIGS. 6 & 7 provide a more detailed inside view of the door system. The small door 11 is shown secured by a latching mechanism 1 to the large door 12 which is secured by a latching mechanism 8 to the side wall 17 of the waste containment area. The sliding door 11 is equipped with four sliding mechanisms 6, which attach to the two upper and lower corners of the door. Each mechanism 6 utilizes a small wheel 5 that slides along a ledge 2 that forms part of the larger door 12. The ledge 2 acts as a track, continuing from one end of the large door 12 to the other, so that the small door 11 can slide on the wheels 5 in and out of a hollow pocket inside the large door 12.

The preferred mechanism for the sliding of the door is the wheel, however other sliding means could also be used.

It is to be understood that the form of the invention herewith shown and described is to be taken as the preferred construction of the unit and that modifications in size may be made without departing from the basic structure of the invention or the scope of the claims. It should be further understood that although the unit is described as being for the purpose of transporting waste, the unit may also carry other materials which require a fully enclosed means of transportation.

Any modifications which would readily be apparent to one skilled in the art, are intended to be within the scope of the present invention. The only limitations to the scope of the present invention are set forth in the claims appended hereto.

The embodiments of the invention in which an exclusive property or privilege is claimed are defined as follows:

1. A device for transporting objects including a wheeled undercarriage and an enclosed containment area, said containment area being defined by a substantially box-like structure defining an interior, at least one primary access opening formed in the substantially box-like structure for accessing the interior, at least one primary door mounted to said substantially box-like structure for selectively opening and closing said primary access opening, a secondary access opening being formed in the primary door, such that the interior can be accessed when the primary door is in a position for closing said primary access opening.

2. A device as claimed in claim 1, wherein a secondary door is provided in association with said secondary access opening for selectively opening and closing said secondary access opening.

3. A device as claimed in claim 1, wherein said primary door is hinged to a wall of the substantially box-like structure.

4. A device as claimed in claim 1, wherein said secondary door is equipped with a sliding means, and said primary door is provided with a track on which said sliding means may move.

5. A device as claimed is claim 4, wherein said first door is provided with a pocket into which said second door may slide.

6. A device as claimed in claim 5, wherein said pocket is defined by an inner wall of said container spaced from an outer wall thereof, and said track extends into said pocket.

7. A device as claimed in claim 6, wherein tension means are provided to maintain said primary door in an open position, and latch means are provided to maintain said primary door in a closed position.

8. A device for transporting waste, including a wheeled undercarriage and an enclosed containment area for the waste, the containment area defining a box-like structure having a floor platform supported on said wheeled undercarriage, first and second opposed side walls and first and second opposed end walls extending upwardly from said floor platform and defining a side wall enclosure, a top cover extending across and connecting portions of said side walls and said end walls opposite said floor platform, said first side wall having a first access opening therein for accessing interior portions of said containment area, a first door movably attached to said first side wall for selectively opening and closing said first access opening, said first door being formed with a first sliding door opening therein, a first sliding door being movably mounted to the first door for selectively opening and closing the first sliding door opening, at least one latching mechanism mounted to portions of said first sliding door and said first door for selectively latching said sliding door in a position for closing the first sliding door opening.

9. The device of claim 8, wherein the second side wall has a second access opening therein and a second door mounted to the second side wall for selectively opening and closing the second access opening, the second door being formed with a second sliding door opening therein, and a second sliding door being movably mounted to the second door for selectively opening and closing the second sliding door opening, a second latching mechanism mounted to portions of said second door and said second sliding door for releasably latching the second sliding door in the closed position.

10. A device of claim 8, wherein the first door in hingedly mounted to said first side wall.

11. A device of claim 8, wherein the wheeled undercarriage comprises a hitch for selectively connecting a plurality of said devices to one another for transporting the waste material.

* * * * *